United States Patent [19]
Dalton et al.

[11] Patent Number: 5,985,389
[45] Date of Patent: Nov. 16, 1999

[54] POLYESTER AND OPTICAL BRIGHTENER BLEND HAVING IMPROVED PROPERTIES

[75] Inventors: James Samuel Nelson Dalton, Kingsport; Steven Lee Stafford, Gray; John David Hewa, Kingsport, all of Tenn.

[73] Assignee: Eastman Chemical Company, Kingsport, Tenn.

[21] Appl. No.: 09/094,792

[22] Filed: Jun. 15, 1998

Related U.S. Application Data

[60] Provisional application No. 60/050,012, Jun. 17, 1997.

[51] Int. Cl.$^6$ .......................... B29D 22/00; C08F 283/04
[52] U.S. Cl. .................. 428/35.7; 528/272; 528/298; 528/302; 528/307; 528/308; 528/308.6; 525/420; 525/425; 525/432; 525/437; 524/81; 524/86; 524/88; 524/155
[58] Field of Search .................................. 528/272, 298, 528/303, 307, 308, 308.6; 525/420, 425, 432, 437; 524/81, 86, 88, 155; 428/35.7

[56] References Cited

U.S. PATENT DOCUMENTS 5,194,319  3/1993  Onaka et al. ........................ 428/224

*Primary Examiner*—Samuel A. Acquah
*Attorney, Agent, or Firm*—Karen A. Harding; Harry J. Gwinnell

[57] ABSTRACT

The present invention is a compositional blend having a polyester, an acetaldehyde reduction compound and less than 50 ppm of an optical brightener. The blend has utility for food and beverage molded containers where improved clarity and flavor retention are important without producing a haze. The acetaldehyde reduction compound can be a low molecular weight partially aromatic polyamide, a low molecular weight aliphatic polyamides or polyesteramide. The optical brightener preferably is a bis(benzoxazolyl) stilbene. Articles, and especially beverage containers, produced from the blend have a yellowness, b*, less than about 2.5.

29 Claims, 12 Drawing Sheets

POLYESTER AND OPTICAL BRIGHTENER BLEND HAVING IMPROVED PROPERTIES

RELATED APPLICATION

This application claims the benefit of the U.S. provisional application having U.S. Ser. No. 60/050012 filed Jun. 17, 1997, the entire disclosure being incorporated herein by reference.

BACKGROUND OF THE INVENTION

The present invention relates to a polyester/polyamide blend composition having a low acetaldehyde content and improved properties. More particularly, the present invention relates to a polyester/polyamide blend which includes an optical brightener having a low acetaldehyde content with improved flavor barrier and color properties. The compositional blend of the invention is particularly useful for the packaging of food and beverages.

It is well known that dicarboxylic acids and dicarboxylic esters can be reacted with glycols to prepare polyesters. Polyesters are used in the fabrication of various articles for household, commercial or industrial use. Such uses include appliance parts, food and beverage containers, and auto parts. A major drawback of many polyesters is their inherent bluish fluorescence. This phenomenon is especially of concern in packaging of products wherein their appearance is as close to their natural state as desired. For example, in the packaging of foods and beverages are where the food or beverages inside a poly(ethylene-2,6-naphthalene dicarboxylate), (PEN) or polyethylene terephthalate (PET) container may appear unnatural.

Polyethylene terephatalate is widely used for the production of light weight plastic articles since PET has excellent mechanical properties such as formability and creep resistance. However, during molding or extrusion processes, acetaldehyde is formed due to degradation reaction. When the polyester is formed into an article, the acetaldehyde in the article walls migrates into the area occupied by the contents of the article. It is known that even small amounts of acetaldehyde adversely affect the flavor of foods, beverages, and the like. For these reasons it is desirable to reduce the production of the acetaldehyde during melt processing or to minimize the migration of the acetaldehyde into the package contents.

In the area of beverage containers, transparent plastic beverage containers are important to mineral water bottlers who want to convey to their consumers that the water is pure, natural and clear of contaminants. Uncolored polyesters, and blue or green colored transparent polyesters are widely used in the water packaging market. Some bottlers prefer uncolored polyester containers while others prefer colored, transparent polyesters. A slight bluish fluorescence is not objectionable for water packaging since the appearance of the water is not sufficiently altered to make the ingredients appear unnatural. The blue and green colors are natural non-objectionable colors that one sees in bodies of water (springs, streams, lakes, oceans) because of reflection of light in varying intensities from the sky or adjacent greenery. Yellow is not one of the colors used in the trade for packaging water as it does not convey purity or naturalness as does green or blue. Additionally, for some juices and carbonated beverages a bluish fluorescence in the packaging material is objectionable since it alters the natural color of the juice or carbonated beverage.

Also important to the trade is a polyester container that does not alter the taste or the chemical nature of water with acetaldehyde. Polyester resins are manufactured and processed in ways to minimize the production of acetaldehyde in the container and contents.

U.S. Pat. No. 5,340,884 discloses reducing the concentration of acetaldehyde contained a polyester by blending 0.05 weight percent to 2.0 weight percent of a low molecular weight polyamide with the polyester. The resultant polyester has an improved flavor retaining property when used for food and beverage packaging. Unfortunately, an undesirable yellow color is also imparted to the polyester. The yellowness in the resultant packaging material must be masked by the addition of a blue dye or ultraviolet absorbers. Use of compounds other than blue dyes and ultraviolet absorbers to mask the imparted yellow color is not disclosed.

U.S. Pat. No. 3,322,680 discloses using a fluorescent brightening agent or an optical brightener at an amount exceeding 50 parts per million (ppm) to improve the whiteness index of $TiO_2$, pigmented polyester. Fibers, films, and shaped articles which have an inherently yellow color before dyeing have a decreased brightness after dyeing. The brightness of these articles can be increased by adding at least one fluorescent 4, 4'-bis(benzoazol-2-yl) stilbene compound in the amount of 0.005 weight percent (50 ppm) to 0.5 weight percent (5000 ppm). One of these compounds, (2,2'-(1,2-Ethenediyldi-4,1-phenylene)bisbenzoxazole), is sold by Eastman Chemical Company under the trade name Eastobrite OB-1.

U.S. Pat. No. 5,393,862 discloses a naphthalenedicarboxylic acid containing polymer composition with reduced fluorescence. A copolymerizable aromatic ketone having at least one acyl group directly attached to the aromatic ring is used as a fluorescence quenching agent. Fluorescence reduction in PET is not disclosed.

Accordingly, there is a need for a transparent polyester packaging material that does not have a yellow appearance and does not alter the pure natural taste or chemical nature of the water.

SUMMARY OF THE INVENTION

Briefly, the present invention is compositional blend having low acetaldehyde formation and improved color comprising a polyester, a polyamide and an optical brightener. More particularly, the blend includes a polyester; from 0.01 weight percent to about 5 weight percent of a polyamide, preferably comprising low molecular weight partially aromatic polyamides having a number average molecular weight of less than 15,000, low molecular weight aliphatic polyamides having a number average molecular weight of less than 7,000, or combinations thereof; and less than 50 ppm of an optical brightener.

DETAILED DESCRIPTION OF THE INVENTION

Figure 1:
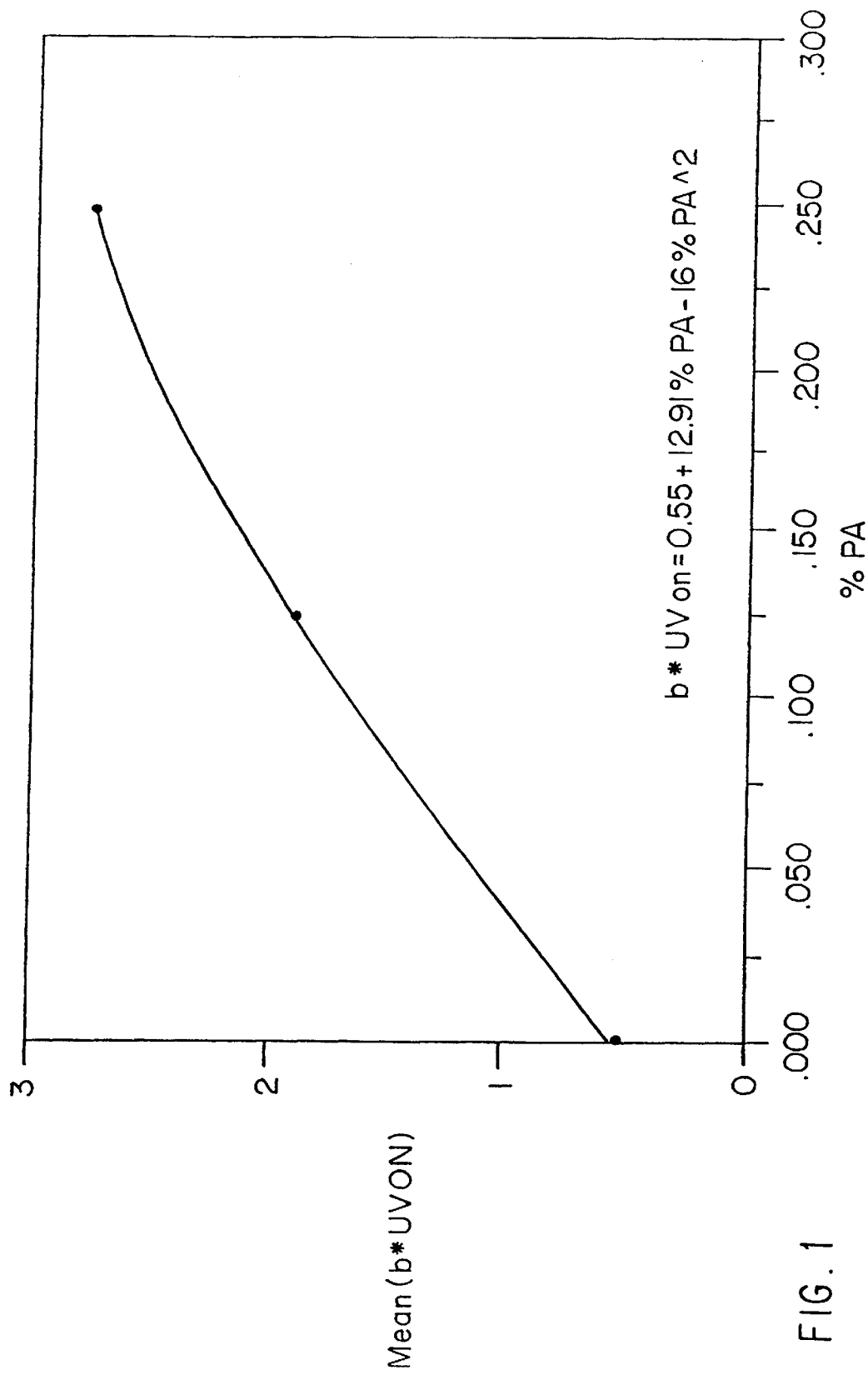
FIG. 1 is a graph illustrating that yellowness, b*, (with UV on) of a polyester detrimentally increases with an increasing amount of polyamide added.

The blend of the present invention includes a polyester, an acetaldehyde reducing compound and an optical brightener. Suitable polyesters according to the present invention include crystallizable polyester homopolymer or copolymer that are suitable for use in packaging, and particularly food packaging. Suitable polyesters are generally known in the art and may be formed having repeating units of a dicarboxylic acid component selected from aromatic dicarboxylic acids, esters of dicarboxylic acids, anhydrides of dicarboxylic esters, and mixtures thereof; and a glycol component. Preferably the dicarboxylic acid is selected from terephthalic acid, dimethyl terephthalate, isophthalic acid, dimethyl isophthalate, dimethyl-2,6-naphthalenedicarboxylate, naphthalenedicarboxylic acid and mixtures thereof, and the glycol is selected from ethylene glycol, diethylene glycol, 1,4-cyclohexane-dimethanol, 1,4-butanediol. More preferably, the dicarboxylic acid component comprises at least 75 mole percent terephthalic acid.

The dicarboxylic acid component of the polyester may optionally be modified with up to about 15 mole percent of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, cyclohexanedicarboxylic acid, cyclohexanediacetic acid, diphenyl-4,4'-dicarboxylic acid, succinic acid, glutaric acid, adipic acid, azelaic acid, sebacic acid, mixtures thereof and the like.

In addition, the glycol component may optionally be modified with up to about 15 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, mixtures thereof and the like. Polyesters may be prepared from two or more of the above diols.

The resin may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

The polyesters of the invention can be prepared by conventional polycondensation procedures well-known in the art. Such processes include direct condensation of the dicarboxylic acid or acids with one or more diols by ester interchange using a dialkyl dicarboxylate in the presence of a catalyst The polyesters may also be subjected to solid state polymerization methods.

The acetaldehyde reducing compound may be any compound which is capable of decreasing the acetaldehyde generated during the production of the polyester and/or subsequent processing steps. Desirably, the acetaldehyde reducing compounds have a melting point below the melting point of the polyester. Generally the acetaldehyde reducing compound is present in the composition in an amount between about 0.01 weight percent and about 5 weight percent, preferably between about 0.01 weight percent and 2 weight percent and most preferably between about 0.05 weight percent and about 2 weight percent. Particularly preferred acetaldehyde reducing compounds include polyamides and polyesteramides. Preferably, the polyamide is selected from the group consisting of low molecular weight aromatic polyamides, low molecular weight partially aromatic polyamides having a number average molecular weight of less than 15,000, low molecular weight aliphatic polyamides having a number average molecular weight of less than 7,000 and combinations thereof. By "partially aromatic polyamide" it is meant that the amide linkage of the partially aromatic polyamide contains at least one aromatic ring and a nonaromatic species.

The partially aromatic polyamides have an I.V. of less than about 0.8 dL/g. Preferably the I.V. of the partially aromatic polyamides is less than about 0.7 dL/g and the number average molecular weight is less than about 12,000. The aliphatic polyamides have an I.V. of less than about 1.1 dL/g. Preferably the I.V. of the aliphatic polyamides is less than about 0.8 dL/g and the number average molecular weight is less than about 6,000. Wholly aromatic polyamides comprise in the molecule chain at least 70 mole % of structural units derived from m-xylylene diamine or a xylylene diamine mixture comprising m-xylylene diamine and up to 30% of p-xylylene diamine and an aliphatic dicarboxylic acid having 6 to 10 carbon atoms, which are further described in Japanese Patent Publications No. 1156/75, No. 5751/75, No. 5735/75 and No. 10196/75 and Japanese Patent Application Laid-Open Specification No. 29697/75.

Low molecular weight polyamides contain a residue from isophthalic acid, terephthalic acid, meta- or para-xylylene diamine, 1,3- or 1,4-cyclohexane(bis)methylamine, cyclohexanedicarboxylic acid, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The low molecular weight polyamides may also contain small amounts of trifunctional or tetrafunctional comonomers such as trimellitic anhydride, pyromellitic dianhydride, or other polyamide forming polyacids and polyamines known in the art.

Preferred low molecular weight partially aromatic polyamides include: poly(m-xylylene adipamide), poly (hexamethylene isophthalamide), poly(hexamethylene adipamide-co-isophthalamide), poly(hexamethylene adipamide-co-terephthalamide), poly(hexamethylene isophthalamide-co-terephthalamide) and combinations thereof. The most preferred low molecular weight partially aromatic polyamide is poly(m-xylylene adipamide) having a number average molecular weight of about 4,000 to about 7,000 and an inherent viscosity of about 0.3 to about 0.6 dL/g.

Preferred low molecular weight aliphatic polyamides include poly(hexamethylene adipamide) and poly (caprolactam). The most preferred low molecular weight aliphatic polyamide is poly(hexamethylene adipamide) having a number average molecular weight of about 3,000 to about 6,000 and an inherent viscosity of 0.4 to 0.9 dL/g. Low molecular weight partially aromatic polyamides, are preferred over the aliphatic polyamides where clarity and dispersibility are crucial.

Preferred low molecular weight aliphatic polyamides include polycapramide (nylon 6), poly(imino(1-oxo-1,7-heptanediyl)) (nylon 7), poly(imino(1-oxo-1,9-nonanediyl)) (nylon-9), polyundecane-amide (nylon-11), polyaurylactam (nylon 12), poly(ethylene-adipamide) (nylon 2,6), poly (tetramethylene-adipamide) (nylon 4,6), poly (hexamethylene-adipamide) (nylon 6,6), poly (hexamethylene-sebacamide) (nylon 6,10), poly (hexamethylene-dodecamide) (nylon 6,12), poly (octamethylene-adipamide) (nylon 8,6), poly (decamethylene-adipamide) (nylon 10,6), poly (dodecamethylene-adipamide) (nylon 12,6) and poly (dodecamethylene-sebacamide) (nylon 12,8).

The low molecular weight polyamides are generally prepared by melt phase polymerization from a diacid-diamine complex which may be prepared either in situ or in a separate step. In either method, the diacid and diamine are used as starting materials. Alternatively, an ester form of the diacid may be used, preferably the dimethyl ester. If the ester is used, the reaction must be carried out at a relatively low temperature, generally 80 to 120° C., until the ester is converted to an amide. The mixture is then heated to the polymerization temperature. In the case of polycaprolactam, either caprolactam or 6-aminocaproic acid can be used as a starting material and the polymerization may be catalyzed by the addition of adipic acid/hexamethylene diamine salt which results in a nylon 6/66 copolymer. When the diacid-diamine complex is used, the mixture is heated to melting and stirred until equilibration.

The molecular weight is controlled by the diacid-diamine ratio. An excess of diamine produces a higher concentration of terminal amino groups. If the diacid-diamine complex is prepared in a separate step, excess diamine is added prior to the polymerization. The polymerization can be carried out either at atmospheric pressure or at elevated pressures.

Suitable polyesteramides include polyesteramides of the general formula:

where A is at least one dicarboxylic acid selected from aromatic or cycloaliphatic dicarboxylic acids having 8 to 14 carbon atoms or aliphatic dicarboxylic acids having 3 to 24 carbon atoms, N is at least one diamine having 2 to 24 carbon atoms, D is at least one diol having 2 to 14 carbon atoms, X is an integer from 0.01 to 0.99 and Y is an integer from 0.99 to 0.01. The most preferred range is for X to vary from 0.25 to 0.74 and Y to range from 0.74 to 0.25. The sum of X and Y is equal to 1.0.

In the above formula, A represents any of the dicarboxylic acids normally used in polyester and polyamide preparations. It is known to one skilled in the art that acid anhydrides, esters, and acid chlorides of these acids can be used to prepare these polyesteramides and are included in the term "dicarboxylic acid."

Suitable dicarboxylic acids are selected from the group consisting of aromatic dicarboxylic acids having 8 to 16 carbon atoms, aliphatic diacarboxylic acids having 3 to 12 carbon atoms and cycloaliphatic dicarboxylic acids having 8 to 12 carbon atoms.

The dicarboxylic acid component (A) of the polyesteramide may consist of one or more different dicarboxylic acids. Preferably the dicarboxylic acid is terephthalic acid, isophthalic acid, 1,4cyclohexanedicarboxylic acid, 1,3-cyclohexane-dicarboxylic acid, 2,6-naphthalene dicarboxylic acid, succinic acid, adipic acid, azelaic acid, sebacic acid, and the like.

The diamine component (N) of the polyesteramide may consist of one or more different diamines. N may be represented by, but not limited to, ethylene diamine, propane diamine, butane diamine, hexane diamine, 1,4-cyclohexanediamine, 1,3-cyclohexane diamine, 1,4-phenylene diamine, methylene dianiline, 1,3-xylylene diamine, 1,3-(2,2-dimethyl)propane diamine, 1,4 and 1,3-cyclohexanebismethylamine, 1,4-xylylene diamine, bis(p-aminocyclohexyl)methane or any combination of these diamines.

The diol component (D) of the polyesteramide may consist of one or more different diols. D may be represented by, but not limited to, ethylene glycol, diethylene glycol, triethylene glycol, propane diol, 1,4-cyclohexanediol, 1,4-butanediol, 2,2-bis-(4-hydroxy-cyclohexane)-propane, 1,3-(2,2-dimethyl)propane diol, 1,4-cyclohexanedimethanol, 1,4-di-(hydroxyethoxy) benzene, hydroquinone, bisphenol A or any combination of these diols.

By correctly balancing the stoichiometry the polyesteramide may be prepared using amino alcohols. These may be used without other diamines or diols or used in combination with the above described diamines and diols. These amino alcohols can be represented, but not limited to ethanol 5 amine, 4-aminomethylcyclohexane-methanol, and 1-amino-3-hydroxy-2,2-dimethyl propane.

The diamine portion of the general structure shown above can also be incorporated via a reactive intermediate prepared by preforming a "monomeric" diamide. For example N,N'-p-carbomethoxybenzoyl-hexamethylene diamine can be used to prepare polyesteramides as described in G. Manzini, et. al, Eur. Polym J. 2, 941 (1973).

It is not necessary that the structure of the polyesteramide be limited to linear polymers. The use of multifunctional branching amines, carboxylic acids, or polyols will result in effective acetaldehyde reducing compositions as long as the resulting branched polymer can be effectively dispersed in the polyester. Thus polyols such as 1,1,1-trimethylolpropane and pentaerythritol are useful as well as multifunctional amines such as tris(2-aminoethyl)amine and multifunctional carboxylic acids such as 1,3,5-benzene tricarboxylic acid. Hyper branching units such as 3,5-diaminobenzoic acid can also be used to build effective acetaldehyde reducing structures.

The polyesteramides of the present invention do not show a significant molecular weight difference in their efficacy of reducing acetaldehyde in polyesters. This is in contrast to the performance of the polyamides described in U.S. Pat. Nos. 5,258,233 and 5,340,884. For example, polyesteramides ranging in molecular weight from 500–1,000,000 (number average) show excellent acetaldehyde reducing characteristics. However, polyesteramides ranging in number average molecular weight of 1,000 to 100,000 are preferred in some cases for ease of blend processing.

The polyesteramides can be prepared by any of the known techniques for polyesteramide synthesis. For example, acid chlorides can be reacted with mixtures of diamines and diols, and conventional melt phase step-growth condensations of diacids, diamines, and diols or diesters, diols, and diamines can be employed. Aminolysis of polyesters with diamines, as described in U.S. Pat. No. 4,606,449, can be used to prepare polyesteramides. Direct melt condensation of dicarboxylic acids, diamines, and diols is a preferred synthetic route.

The composition of the polyesteramide is controlled by the molar ratio of the diamine, diol, and dicarboxylic acid. This can be adjusted to control molecular weight or control the end group functionality. The order of addition of the reactants can also be used to change the structure of the polyesteramide. For example, an initial charge of ester and alcohol followed by addition of the diamine to the prepolymer can yield a "blocky" structure.

The process for preparing the polyester/polyamide blends of the present invention involve preparing the polyester and low molecular weight polyamide, respectively, by processes as mentioned previously. The polyester and polyamide are dried in an atmosphere of dried air or dried nitrogen, or under reduced pressure. The polyester and polyamide are mixed and subsequently melt compounded, for example, in a single or twin screw extruder. Melt temperatures must be at least as high as the melting point of the polyester and are typically in the range of 260–310° C. Preferably, the melt compounding temperature is maintained as low as possible within said range. After completion of the melt compounding, the extruded material is withdrawn in strand form, and recovered according to the usual way such as cutting. Instead of melt compounding, the polyester and polyamide may be dry-blended and heat-molded or draw-formed into plastic articles.

The polyamide can be added in the late stages of polyester manufacture. For example, the polyamide can be blended with the molten polyester as it is removed from the polycondensation reactor, before it is pelletized. This method, however, is not desirable if the polyester/polyamide blend will be subjected to solid state polymerization since undesirable color and/or haze may develop during extended time at elevated temperatures.

The polyamide may also be added as part of a polyolefin based nucleator concentrate where clarity is not critical such as in crystallized thermoformed articles. The polyamide may also be as a component of a polyester concentrate. The concentrate carrier resin may use either the acid or ester form of the acid component of the polyester. Preferably the carrier resin is derived from the acid form.

The compositional blend of the invention further includes an optical brightener. The optical brightener compensates for the yellow cast produced by the absorption of short-wavelength light such as violet to blue by the polyester. Typical optical brighteners fluoresce upon irradiation with ultraviolet light emitting visible light. Desirably, the optical brightener has stability to temperatures as high as 310° C. to 330° C., so that it may be incorporated into the polyester during the melt blending process or extrusion process.

The optical brighteners of the invention include bis (benzoxazolyl) stilbenes such as those disclosed in U.S. Pat. No. 4,794,071, the disclosure of which is incorporated herein by reference. Desirably, the optical brighteners include the optical brightener OB-1, a stilbene available from Eastman Chemical Company, Kingsport Tenn. described in U.S. Pat. Nos. 3,260,715 and 3,322,680, and HOSTALUX® KS, a mixture of stilbenes available from Hoechst AG described in U.S. Pat. No. 4,794,071, the entire disclosures of each being incorporated herein by reference.

Other optical brighteners include symmetrical and asymmetrical bistriazinyl derivatives of 4,4'-diaminostilbene-2,2'-disulfonic acid as shown in Table 1 where R and R', can be the same or different. Their preparation is well known to those skilled in the art and generally includes reacting 2 moles of cyanuric chloride with 1 mole of 4,4'-diaminostilbene-2,2'-disulfonic acid. Asymmetric derivatives can be synthesized via 4-amino-4'-nitrostilbene-2,2'-disulfonic acid. These sulfonic acid group substituted brighteners are generally used in their salt form, and particularly, their sodium salts.

TABLE 1

| R | R' |
|---|---|
| -anilino | -methoxy |
| -anilino | -methylamino |
| -anilino | -N-Methyl-N-hydroxy-ethylamino |
| -anilino | bis(hydroxyethyl)amino |
| -anilino | morpholino |
| -anilino | anilino |
| -sulfanilic acid | bis(hydroxyethyl)amino |

TABLE 1-continued

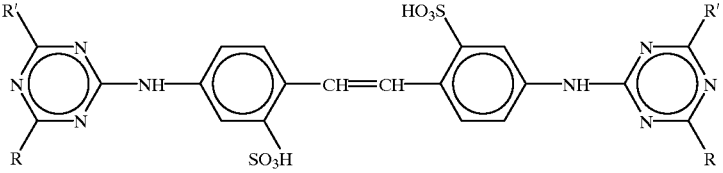

1

| R | R' |
|---|---|
| -metanilic acid | bis(hydroxyethyl)amino |
| Anilin-2,5,-disulfonic acid | diethylamino |

The groups R and R' can be substituted or non-substituted amino groups, substituted hydroxyl groups, etc. Other optical brighteners include: mono(azol-2-yl)stilbenes, such as, 2-(stilben-4-yl)naphthotriazoles and 2-(4-phenylstilben-4-yl)benzoxazoles;

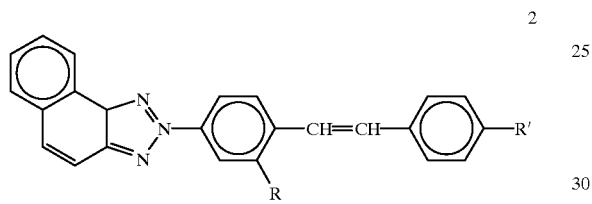

2 wherein R is —SO₃H or C=N and R' is hydrogen or chlorine.

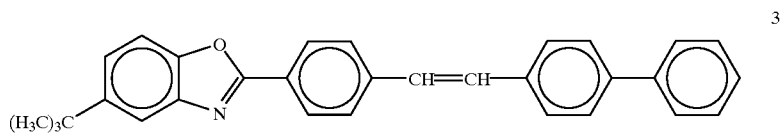

3 bis(azol-2-yl)stilbenes such as, 4,4'-bis(triazol-2-yl)stilbene-2,2'-disulfonic acids;

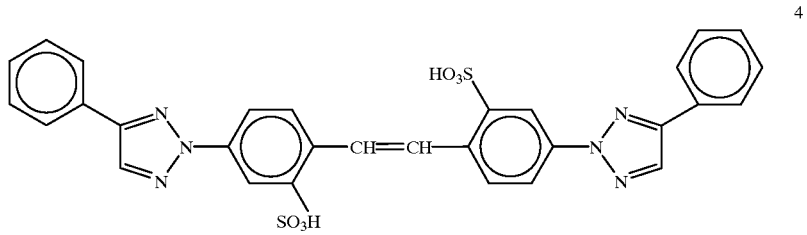

4 styryl derivatives of benzene and biphenyl such as, 1,4-bis(styryl)benzenes and 4,4'-bis(styryl)biphenyls;

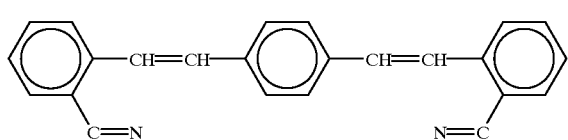

5

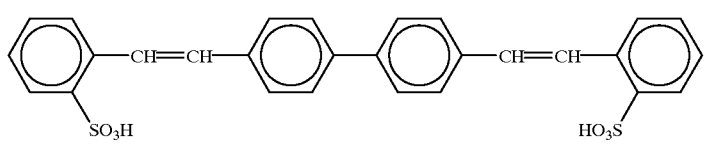

6

1,3-diphenyl-2-pyrazolines, such as those in Table 2 below;

wherein R, R' and R" are as follows:

TABLE 2

7

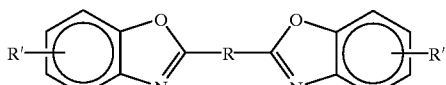

wherein R, R' and R" are as follows:

| R | R' | R" |
|---|----|----|
| —H | —H | —SO$_3$H |
| —H | —H | —SO$_2$NH$_2$ |
| —H | —H | —SO$_2$NHCH$_2$CH$_2$CH$_2$N(CH$_3$)$_3$ —SO$_3$OCH$_3$ |
| —H | —H | —SO$_2$CH$_2$CH$_2$SO$_3$H, sodium salt |
| —H | —H | SO$_2$CH$_2$CH$_2$O=CH=CH$_2$=N(CH$_3$)$_2$<br>‖<br>CH$_3$ |
| —Cl | —CH$_3$ | —SO$_2$CH$_2$CH$_2$SO$_3$H | bis(benzoxazol-2-yl) derivatives, such as those shown in Table 3 below;

TABLE 3

8

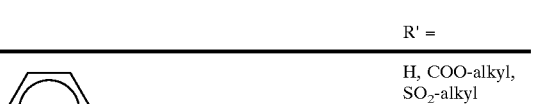

wherein R$^a$ and R' are:

| R$^a$ | R' = |
|-------|------|
| C$_2$H$_2$ | alkyl, 5-CH$_3$ |
| 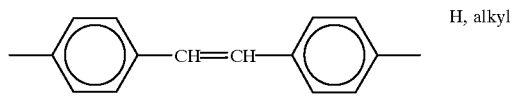 | H, alkyl |

TABLE 3-continued

8

wherein R$^a$ and R' are:

| R$^a$ | R' = |
|-------|------|
| 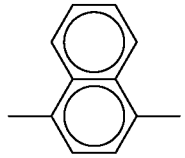 | H, COO-alkyl, SO$_2$-alkyl |
| 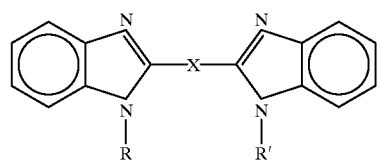 | H, alkyl |

R$^a$ presents a conjugated system bis(benzimidazol-2-yl) derivatives;

9

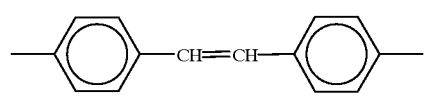

wherein X is C$_2$H$_2$ or

and R and R' can be the same or different selected from hydrogen, methyl, alkyl, hydroxyalkyl and the like; 2-(benzofuran-2-yl)benzimidazoles of the formula:

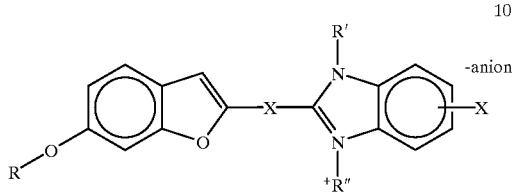

wherein R is alkyl or alkylaryl, and X, R' and R" can be the same or different selected from hydrogen, or a colorless substituent, and mixtures of the above.

The amount of optical brightener used in the present invention is an amount sufficient to provide a transparent polyester container with a minimum level of blue fluorescence yet mask the yellow color imparted by the acetaldehyde reducing additive. Preferably, the amount of optical brightener used is from about 1 to less than 50 ppm. Those of skill in the art should appreciate that within this range, the desired amount of optical brightener will vary depending on several factors including the acetaldehyde reducing additive and amount of acetaldehyde reducing additive which is used and the thickness of the container or formed article which is produced. Generally, it is desirable to return the color of the bottle to that displayed by a polyester without any acetaldehyde reducing additive.

The polyester blend containers for mineral water in this invention include refillable, one-way, and crystallized finish types but they are not limited to these types. The containers of this invention can be made from a two-stage process of injection molding of preforms followed by reheat-blow molding of the preforms. Containers that do not utilize a preform are also included in this invention. These containers can be made from other processes such as extrusion blow molding, extrusion-stretch blow molding, injection blow molding, vacuum forming, thermoforming, extrusion forming, and compression molding but are not limited to these processes. The containers of the present invention may be formed having a single layer or multiple layers.

Polyester blend containers that are prepared from acetaldehyde reducing additives other than the low molecular weight polyamides of U.S. Pat. No. 5,340,884 and from EASTOBRITE OB-1 are included in this invention when they are within the EASTOBRITE OB-1 concentration range of the invention. An acetaldehyde-reducing additive offered by Sukano Products (Chemiehandel SE) is an example.

The blends of this invention serve as excellent starting materials for the production of moldings of all types by extrusion or injection molding. Specific applications include various packaging applications such as thermoformed or injection molded trays, lids and cups; injection stretch blow-molded bottles, film and sheet; extrusion blow-molded bottles and multi layer articles. Examples of package contents include, but are not limited to, food, beverages, and cosmetics.

Many other ingredients can be added to the compositions of the present invention to enhance the performance properties of the blends. For example, crystallization aids, impact modifiers, surface lubricants, denesting agents, stabilizers, antioxidants, ultraviolet light absorbing agents, metal deactivators, colorants such as titanium dioxide and carbon black, nucleating agents such as polyethylene and polypropylene, phosphate stabilizers, fillers, and the like, can be included herein. All of these additives and the use thereof are well known in the art and do not require extensive discussions. Therefore, only a limited number will be referred to, it being understood that any of these compounds can be used so long as they do not hinder the present invention from accomplishing its objectives.

The present invention will be further illustrated by consideration of the following examples, which are intended to be exemplary of the invention. The following test methods were used to characterize containers made from compositions of the invention. All parts and percentages in the examples are on a weight basis unless stated otherwise.

Bottle sidewall color values were measured using the Hunter Lab CIELAB-L*, a*, b* test, D65 daylight illuminant, 10 degree observer, reflectance mode, specular included. Measurements were made with and without the UV source (i.e., Lw on or UV off, respectively).

The CIE (Commission International d'Eclairage) b* value is an internationally accepted yellowness measurement. A negative b* value indicates a blueness resulting from the fluorescence of the optical brightener; a positive b* value indicates an undesirable yellowness of the polyester. Color measurement theory and practice are discussed in greater detail in Anni Berger-Schunn in "Practical Color Measurement", pp. 39–56 and 91–98 Wiley, N.Y. (1994).

Residual acetaldehyde measurements were made on ground preforms using Dynamix Headspace Desorption test, 150° C. (302° F.), 10 minutes. Preforms were stored in dry ice and freezer at –40° F. (–40° C.) until testing.

Preform inherent viscosity (I.V.) was measured using 0.0176 oz (0.50 grams) of polymer per 3.38 oz (100) ml of a solvent consisting of 60% by weight phenol and 40% by weight tetrachloroethane.

A Perkin Elmer LS-50B Luminescence Spectrometer was used to determine fluorescence intensities. All samples were collected using the following parameters: Excitation slit=2.5 nm, Emission slit=5 nm, Scan range=395–600 nm, Excitation wavelength=376 nm and a 4 percent filter on the emission side. The peak used for measurements was at a 440 nm.

EXAMPLES 1–11

Low acetaldehyde concentrates were prepared in a PET 9921W base with the levels of low molecular weight polyamide additive and Eastobrite OB-1 as shown in Table 1 below. The low molecular weight polyamide used in this Example is described in U.S. Pat. No. 5,340,884, Example numbers 9–15, the disclosure of which is incorporated herein by reference. The Eastobrite OB-1 used had a particle size of 75 microns.

TABLE 1

LOW ACETALDEHYDE CONCENTRATE COMPOSITION

| Concentrate | % Polyamide | Eastobrite OB-1 Concentration (ppm) |
|---|---|---|
| A | 12.5 | 0 |
| B | 25 | 0 |
| C | 12.5 | 2000 |
| D | 12.5 | 5000 |
| E | 25 | 5000 |
| F | 25 | 10000 |
| G | 25 | 20000 |

Bulk PET 9921 was dried at 302° F. (150° C.) for 8 hours in a Conair dehumidifying dryer. The low AA concentrates were dried at 140° F. (60 ° C.) for 8 hours. The PET was cooled to 140° F. (60 ° C.) and blended with the above concentrates prior to injection molding. After drying and blending, injection molding was conducted on a Cincinnati Milacron 150-ton Hydradamp injection molding machine. The machine is equipped with a 16:1 L/D 1.624-inch general purpose injection molding screw. Injection molding temperature was 520° F. (271° C.). Preforms were stretch blow molded to form a 1.585 quart (1.5 liter) refill bottle with a sidewall thickness of 0.020 inches (0.0508 cm). Eleven examples were produced using the above injection molding and stretch blow molding process conditions. The eleven samples were analyzed to determine the container side wall color, yellowness, residual AA, Preform I.V. and fluorescence intensity. The results are shown in Tabes 3–5 below.

TABLE 2

PROCESSING CONDITIONS

| Example | Target % PA in Preform | Target OB1 in Preform PPM | Low AA Conc. # | Weight percent of Conc. Gms blended into 17 lbs. of PET 9921 | Mean I.V. (dL/g) |
|---|---|---|---|---|---|
| 1 Control | None | None | None | None | 0.735 |
| 2 | .125 | None | A | 77 | 0.738 |
| 3 | .125 | 10 | A&C Blend | 38.5 of A 38.5 of C | 0.709 |
| 4 | .125 | 20 | C | 77 | 0.692 |
| 5 | .125 | 50 | D | 77 | 0.697 |
| 6 | .25 | None | B | 77 | 0.702 |
| 7 | .25 | 10 | B&E Blend | 61.6 of B 15.4 of E | 0.710 |
| 8 | .25 | 25 | B&E Blend | 38.5 of B 38.5 of E | 0.705 |
| 9 | .25 | 50 | E 25% | 77 | 0.714 |
| 10 | .25 | 100 | F | 77 | 0.724 |
| 11 | .25 | 200 | G | 77 | 0.590 |

TABLE 3

FLUORESCENT INTENSITY AND PREFORM AA CONCENTRATION

| Example | Target Weight % Polyamide | Target Eastobrite OB1 Conc (PPM) | Mean Bottle Sidewall Fluorescent Intensity | Mean Preform Acetaldehyde Conc. (ppm) |
|---|---|---|---|---|
| 1 | 0 | 0 | 5 | 5.55 |
| 2 | 0.125 | 0 | 5 | 1.37 |
| 3 | 0.125 | 10 | 116 | 1.31 |
| 4 | 0.125 | 20 | 181 | 1.02 |
| 5 | 0.125 | 50 | 288 | 0.83 |
| 6 | 0.25 | 0 | 5 | 0.45 |
| 7 | 0.25 | 10 | 125 | 0.27 |
| 8 | 0.25 | 25 | 171 | 0.26 |
| 9 | 0.25 | 50 | 422 | 0.48 |
| 10 | 0.25 | 100 | 305 | 0.53 |
| 11 | 0.25 | 200 | 349 | 0.60 |

TABLE 4

CIELAB COLOR DATA (UV ON)

| Examples | Target Weight % Polyamide | Target Eastobrite OB1 Conc (PPM) | Mean L* (UV On) | Mean b* (UV On) | Mean a* (UV On) |
|---|---|---|---|---|---|
| 1 | 0 | 0 | 90.33 | 0.55 | −0.91 |
| 2 | 0.125 | 0 | 91.02 | 1.91 | −1.32 |
| 3 | 0.125 | 10 | 86.26 | 0.45 | −0.93 |
| 4 | 0.125 | 20 | 90.86 | −0.31 | −1.10 |
| 5 | 0.125 | 50 | 90.08 | −0.71 | −1.16 |
| 6 | 0.25 | 0 | 91.1 | 2.78 | −1.73 |
| 7 | 0.25 | 10 | 87.23 | 1.44 | −1.5 |
| 8 | 0.25 | 25 | 88.39 | 0.95 | −1.49 |
| 9 | 0.25 | 50 | 90.76 | 0.15 | −2.43 |
| 10 | 0.25 | 100 | 90.7 | 0.19 | −1.79 |
| 11 | 0.25 | 200 | 91.63 | 0.45 | −2.16 |

TABLE 5

CIELAB COLOR DATA (UV OFF)

| Examples | Target Weight % Polyamide | Target Eastobrite OB1 Conc (PPM) | Mean L* (UV Off) | Mean b* (UV Off) | Mean a* (UV Off) |
|---|---|---|---|---|---|
| 1 | 0 | 0 | 88.45 | .66 | −.88 |
| 2 | 0.125 | 0 | 90.36 | 2.04 | −1.42 |
| 3 | 0.125 | 10 | 88.29 | 1.34 | −1.29 |
| 4 | 0.125 | 20 | 90.29 | .80 | −1.48 |
| 5 | 0.125 | 50 | 90.82 | .77 | −1.66 |
| 6 | 0.25 | 0 | 90.87 | 2.85 | −1.76 |
| 7 | 0.25 | 10 | 88.69 | 2.4 | −1.77 |
| 8 | 0.25 | 25 | 88.24 | 1.99 | −1.76 |
| 9 | 0.25 | 50 | 90.41 | 1.33 | −1.78 |
| 10 | 0.25 | 100 | 90.06 | 1.83 | −2.17 |
| 11 | 0.25 | 200 | 90.40 | 2.23 | −2.56 |

The term "designated OB-1 level" is related to the EASTOBRITE OB-1 concentration by the following equation:

DESIGNATED OB-1 LEVEL=(OB-1 concentration (ppm)+10 ppm)/(10 ppm)

Figure 2:
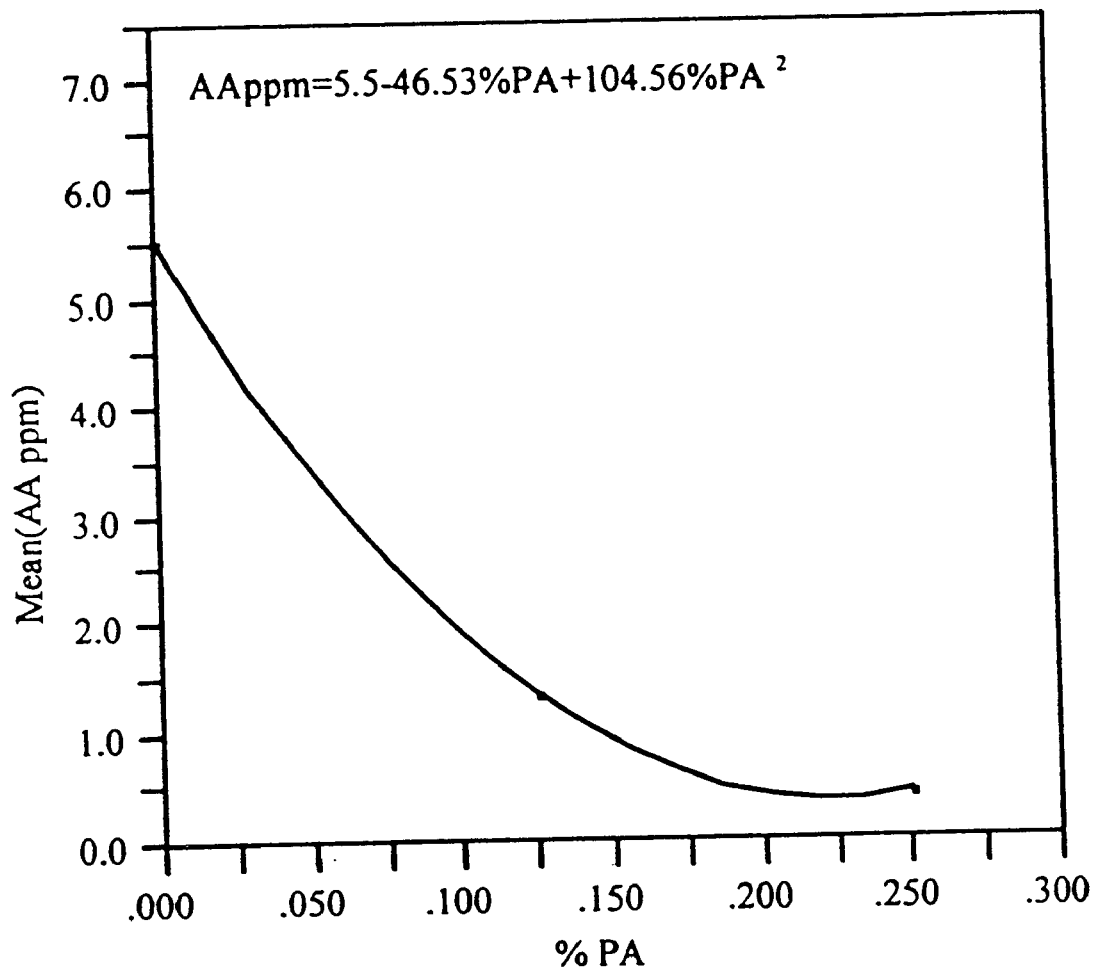
FIG. 2 is a graph illustrating that the concentration of acetaldehyde, (ppm), of a polyester decreases as the concentration of polyamide increases.
Figure 6:
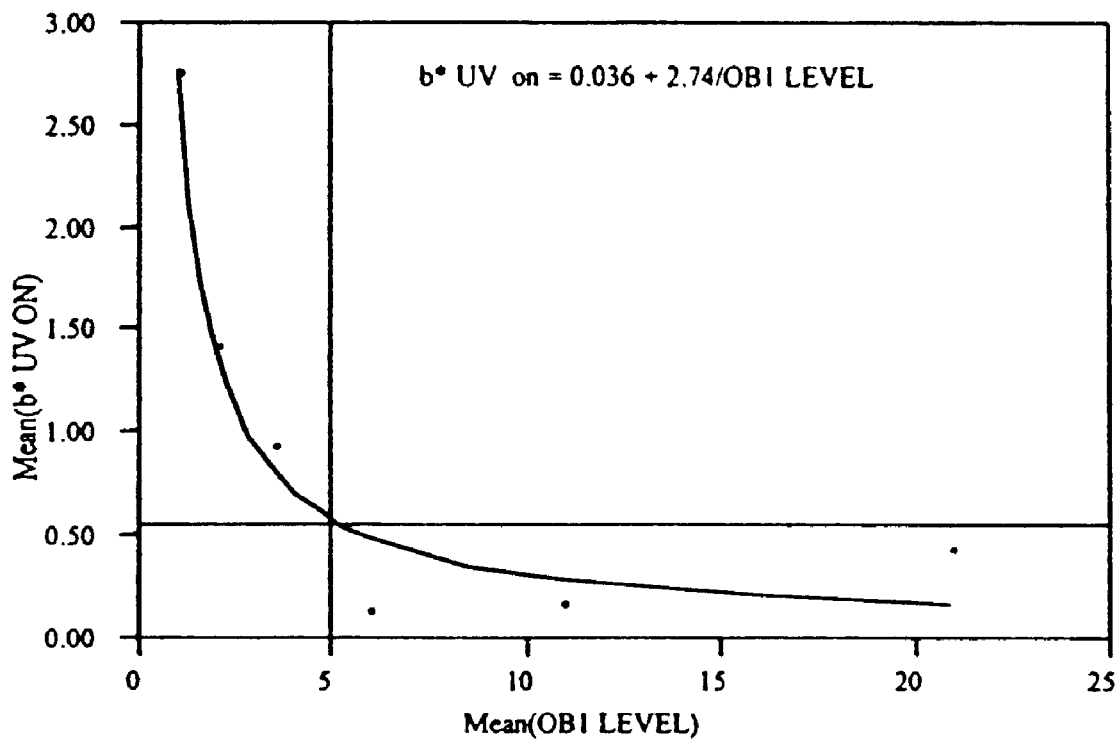
FIG. 6 is a graph illustrating the yellowness (UV on) versus the designated optical brightener level of a polyester at 0.25% target polyamide level.
Figure 7:
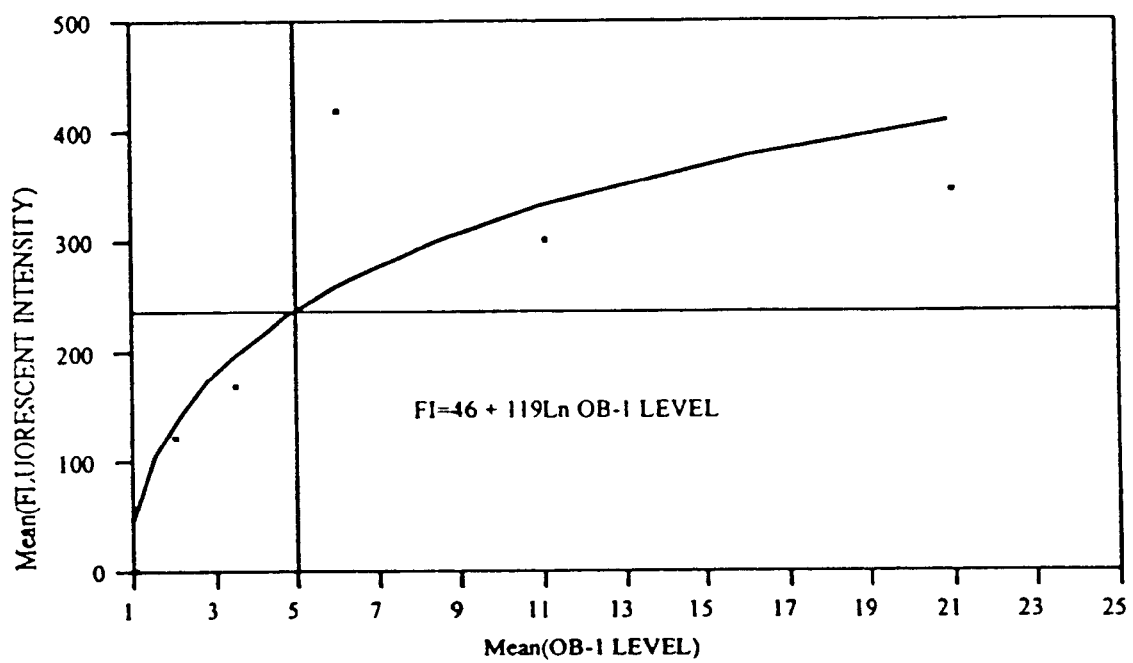
FIG. 7 is a graph illustrating the fluorescent intensity versus the designated optical brightener level of a polyester at 0.25% target polyamide level.

Example 1, and prior art Examples 2, and 6 demonstrate the undesired effect of the low molecular weight polyamide on the bottle sidewall b* color value when no EASTOBRITE OB-1 is present. Tables 4 and 5 show the color values with the UV light source on and off. Yellow b* (UV on) detrimentally increases as the amount of polyamide added is increased (FIG. 6). FIG. 2 shows that the acetaldehyde concentration beneficially decreases as the amount of polyamide increases.

Following the teachings of the prior art, 50 ppm of EASTOBRITE OB-1 were used to prepare Example 5 containing 0.125 % polyamide. The b* (UV on) level was −0.71 and the fluorescent intensity of the bottle sidewall was 288. An increasing b* indicates the yellowness of the sample is increasing undesirably. The fluorescent intensity at this prior art level of EASTOBRITE OB-1 is greatly in excess of the amount required to reduce the b* color value of the bottle sidewall to the level of the control PET (mean b*=0.55 (UV on), range=0.49–0.60) that contained no polyamide (Example 1). Likewise the EASTOBRITE OB-1 concentration was far greater than the amount required to reduce the b* (UV on) value to zero. The concentration of EASTOBRITE OB-1 in Example 5 is outside the range of this invention.

Figure 3:
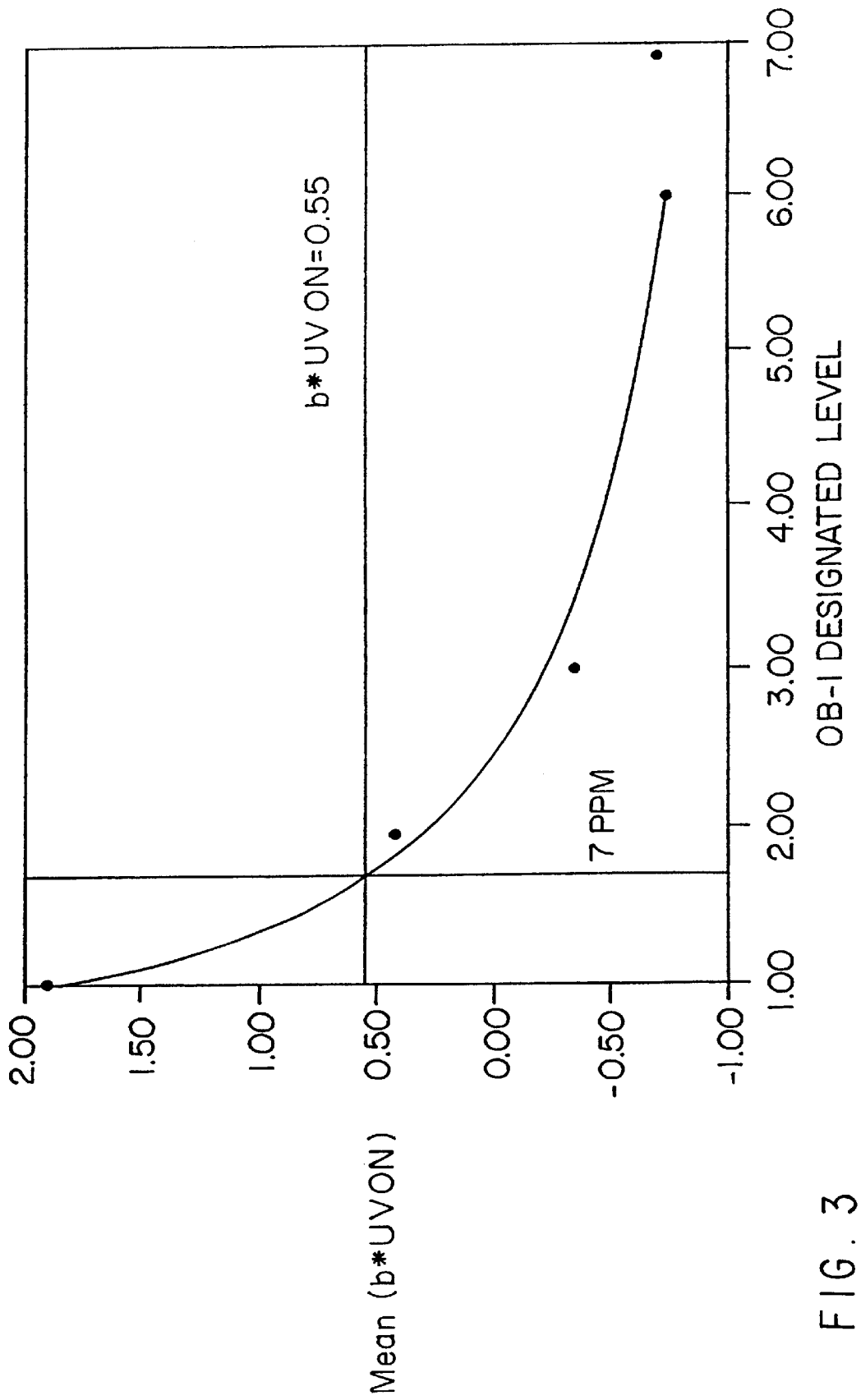
FIG. 3 is a graph illustrating the effect on yellowness, (UV on) of a polyester bottle preform that coincides with the increase in concentration of optical brightener.
Figure 4:
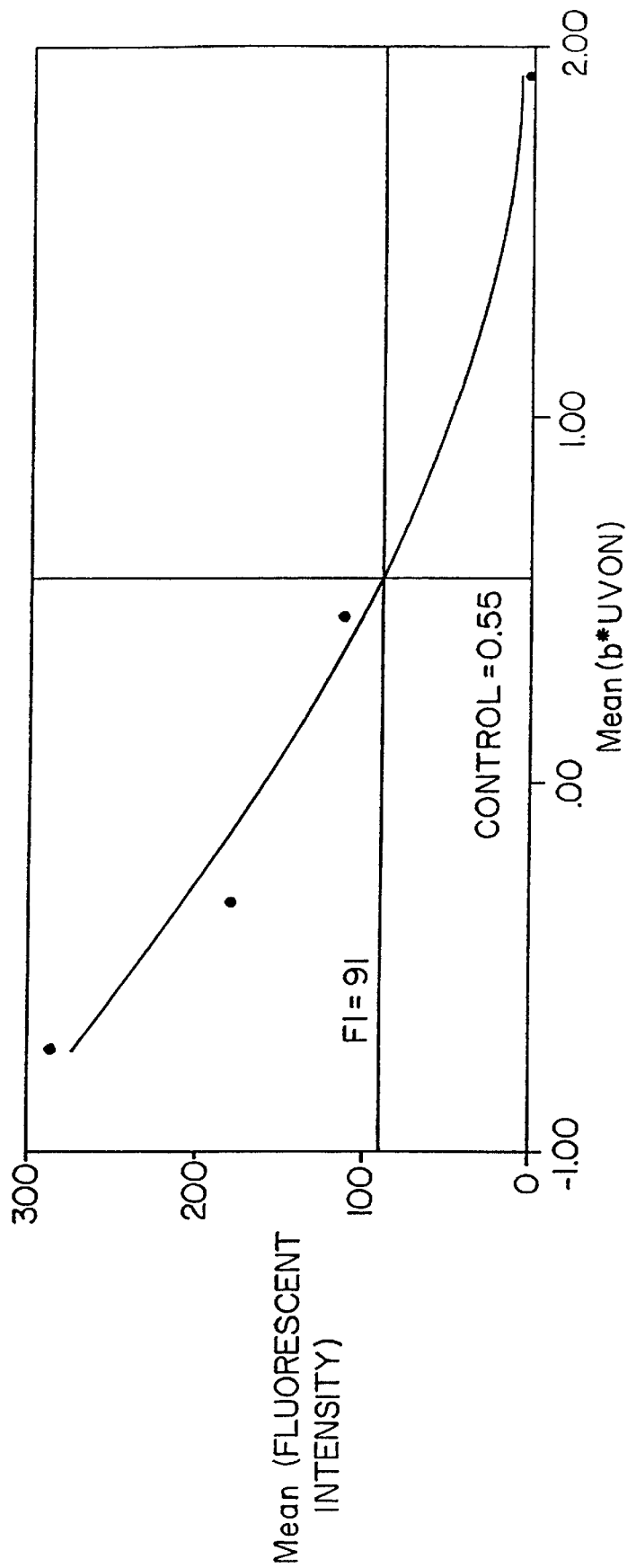
FIG. 4. is a graph illustrating the fluorescent intensity versus yellowness (UV on) of a polyester at 0.125% of target polyamide level.
Figure 5:
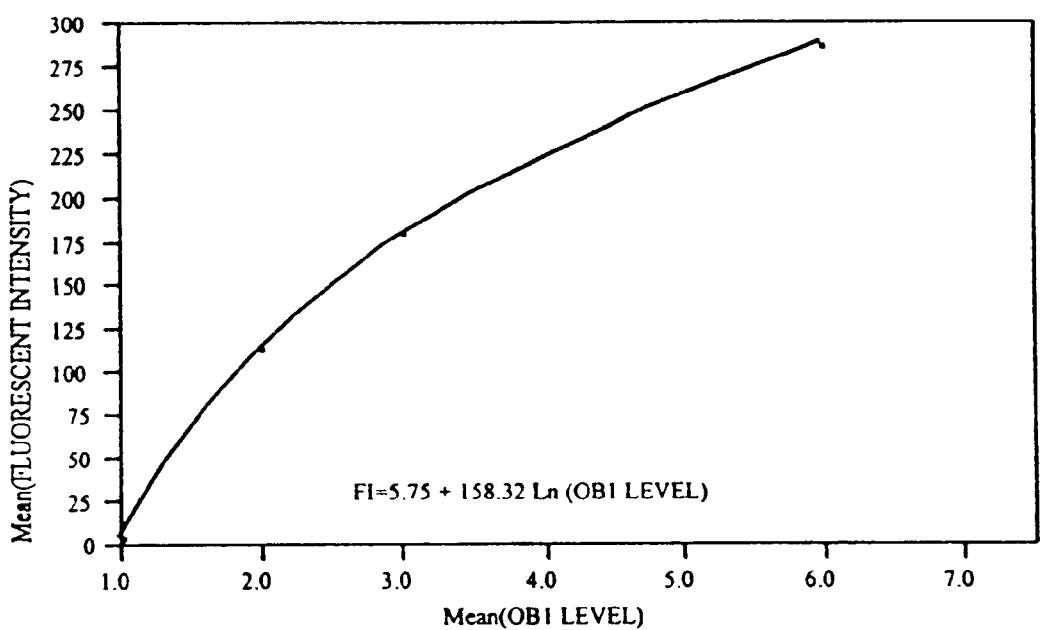
FIG. 5 is a graph illustrating the fluorescent intensity versus the designated optical brightener level for a polyester at 0.125% target polyamide level.

Examples 2, 3, 4, and 5 demonstrate the effect of increasing EASTOBRITE OB-1 concentration from zero to 50 ppm on the bottle sidewall b* (UV on) color value (Table 4) and fluorescent intensity (Table 3). Examples 2–5 and FIGS. 3 and 5 clearly show that only compositions having both polyamide and an optical brightener in the amounts recited herein display both acceptable b* and fluorescence.

Examples 6 through 11 demonstrate that even at higher polyamide concentrations, the amount of optical brightener necessary to provide a transparent polyester container having a minimum fluroescence and mask the yellowness of the polyester having a polyamide is well below that suggested by the prior art.

Figure 8:
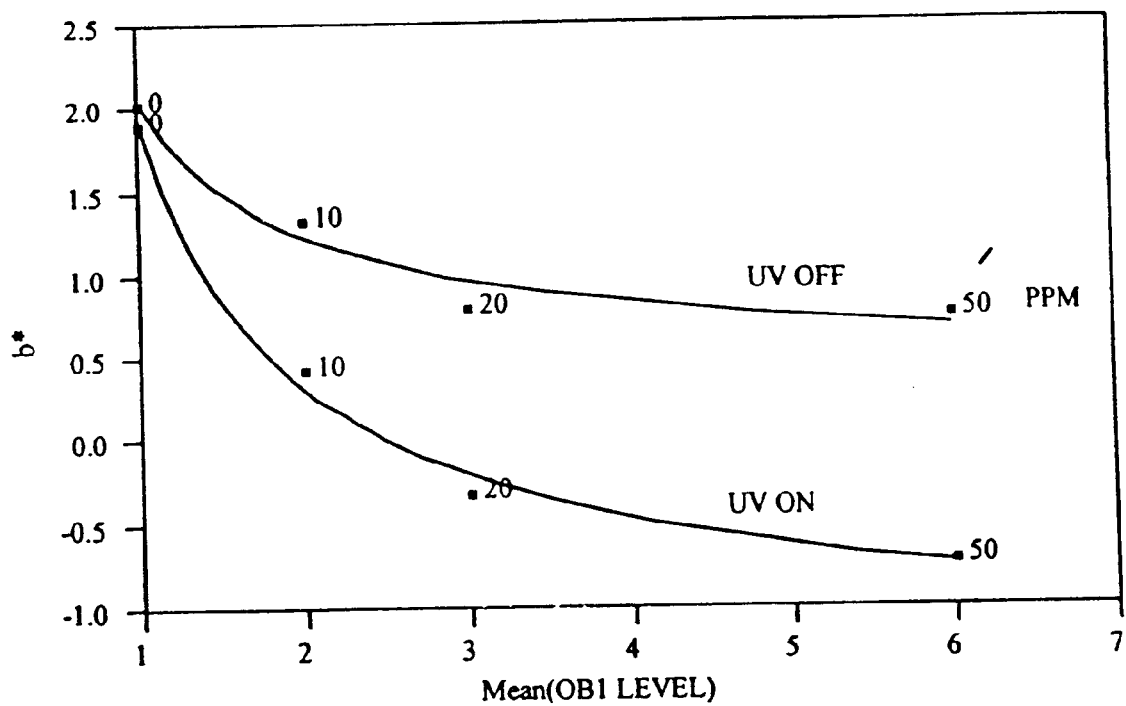
FIG. 8 is a graph illustrating the yellowness (UV on or off) versus the designated optical brightener level of a polyester at 0.125% target polyamide level.
Figure 9:
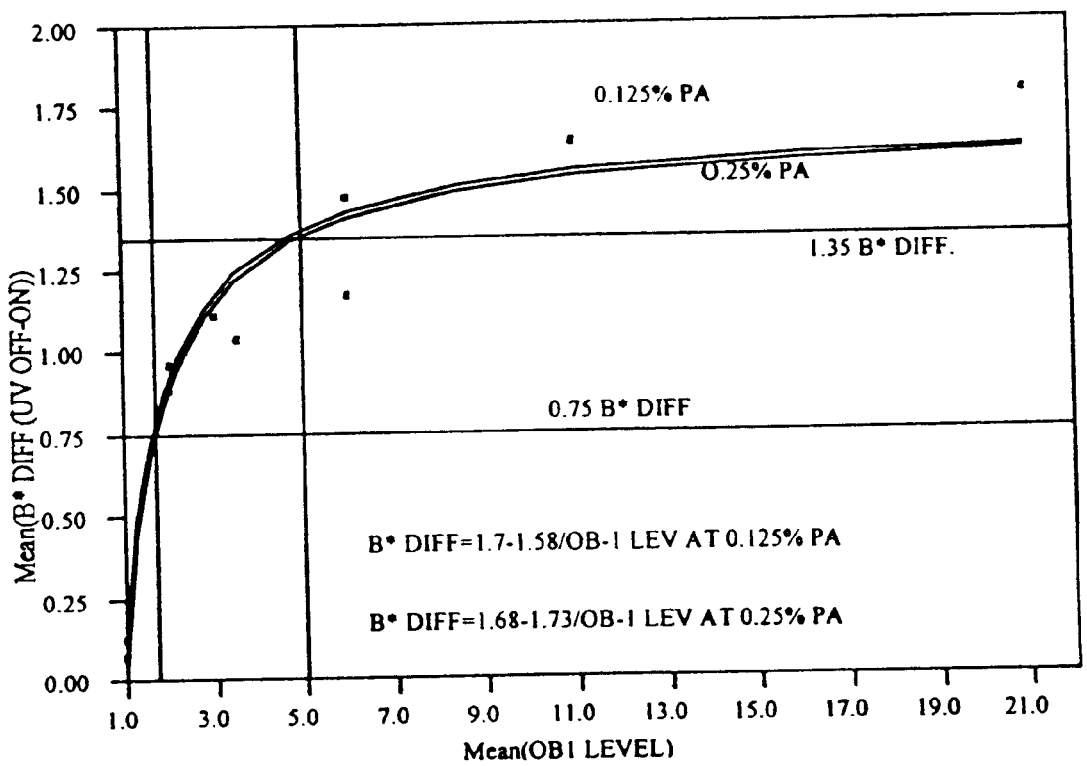
FIG. 9 is a graph illustrating the yellowness difference (UV off-on) versus the designated optical brightener level of a polyester for 0.125% and 0.25% the target polyamide level.
Figure 10:
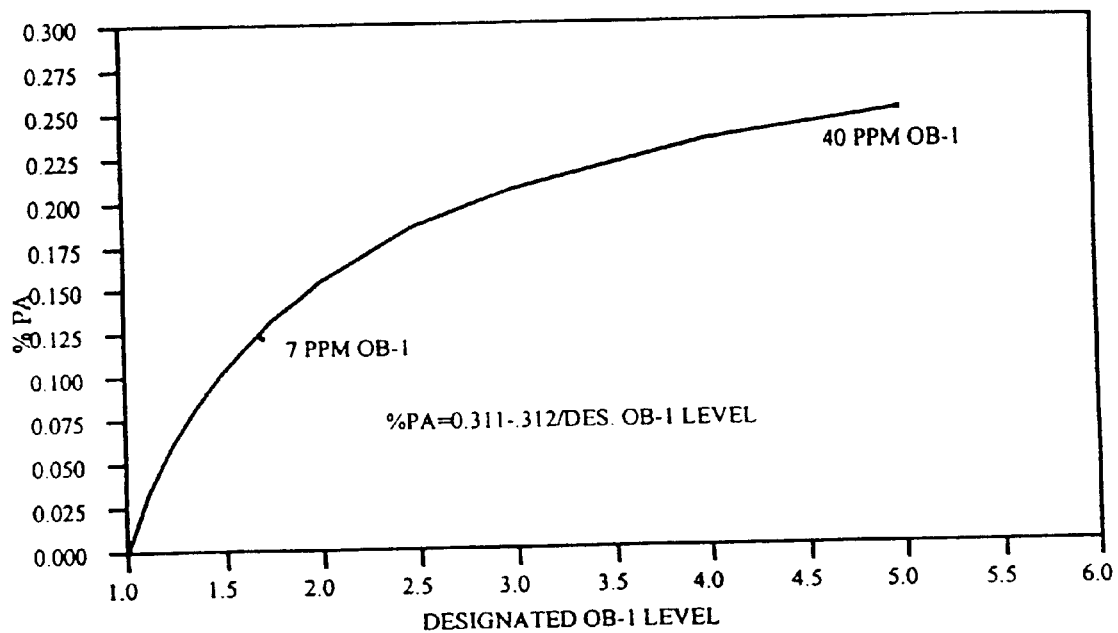
FIG. 10 is a graph illustrating the percent of polyamide versus the designated level of optical brightener required to reduce the yellowness color level in a polyester to the desired value for PET 9921 having no polyamide.
Figure 11:
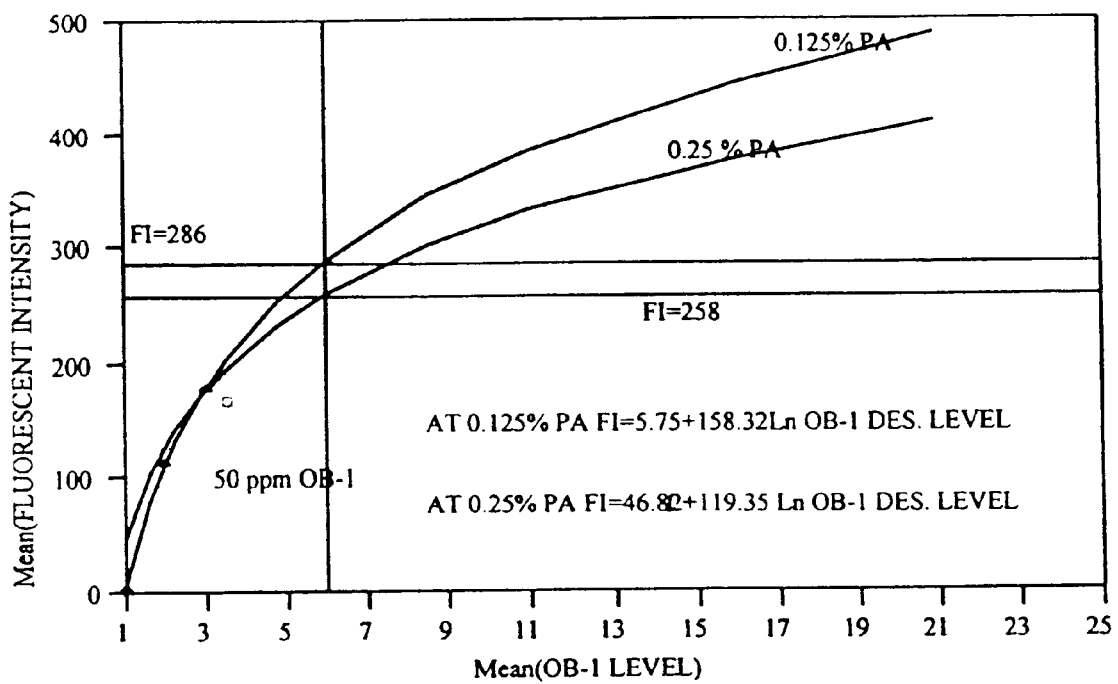
FIG. 11 is a graph illustrating the fluorescent intensity versus the designated optical brightener level in a polyester for 0.125% and 0.25% the target polyamide level.

The visual appearance of the container with EASTOBRITE OB-1 depends on the amount of UV light present. With high levels of UV light present, the container with the EASTOBRITE OB-1 additive has a bluer appearance than at lower levels of UV light. This difference in blueness is demonstrated in FIG. 8 for containers with 0.125 percent polyamide and various designated levels of EASTOBRITE OB-1. The b* color values are shown as a function of designated EASTOBRITE OB-1 level with the UV light source on and off in the D65 test procedure. One can see that the b* value is lower with the UV light on. The lower value indicates a bluer container. Containers fabricated from compositions of the present inventions display acceptable fluorescence levels while containers containing conventional amounts of an optical brightener do not. (Examples 5, 9–11).

Figure 12:
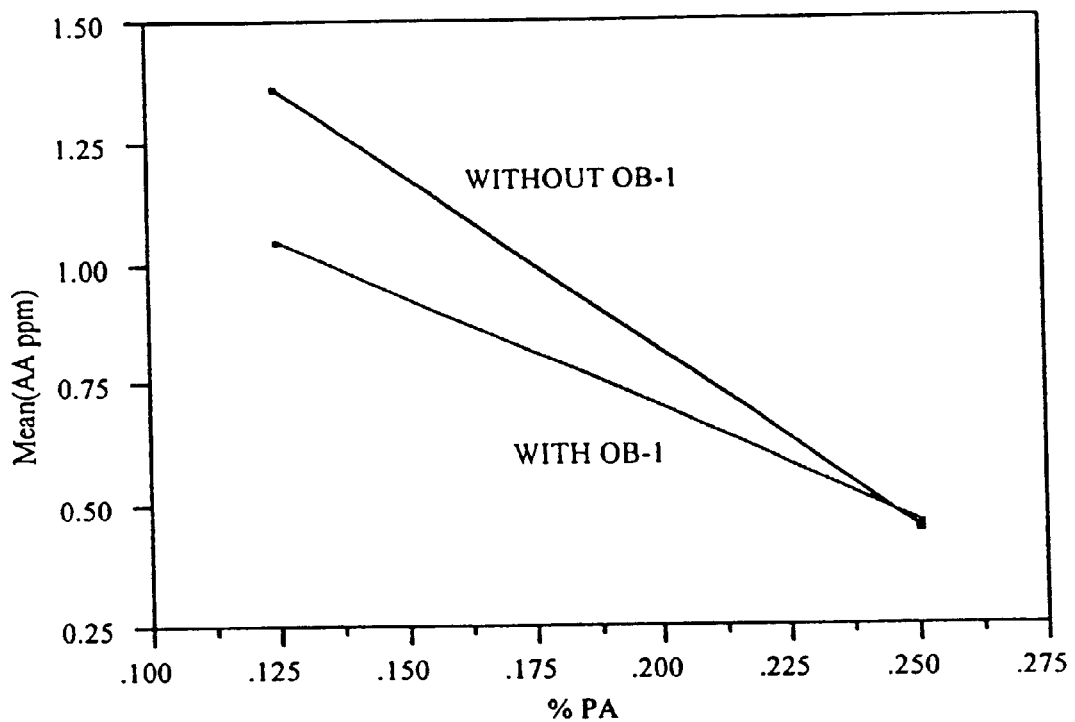
FIG. 12 is a graph illustrating the preform acetaldehyde concentration (ppm) versus the percent polyamide in a polyester with and without the inclusion of the optical brightener.

The preform acetaldehyde concentration data shown in FIG. 12 demonstrates that addition of EASTOBRITE OB-1 to the PET/polyamide blend preform does not reduce the acetaldehyde reduction capability of the polyamide additive.

From the above, the desired b* color level (UV on) is the value of the PET control containing no polyamide additive, i.e. 0.55. The designated level of optical brightener, EASTOBRITE OB-1, required may further depend on the thickness of the article's side wall. The designated level of EASTOBRITE OB-1 optical brightener for PET 9921 for a 0.020 (0.0508 cm) inch thick bottle sidewall is described by the equation:

AMOUNT OF OPTICAL BRIGHTENER=(−0.312)/(% POLYAMIDE−0.311)

From the above, preferred concentrations for EASTOBRITE OB-1 as the optical brightener range from 7 ppm for 0.125 percent polyamide to 40 ppm for 0.25 percent polyamide.

The fluorescent intensity of the present invention ranges from about 5 to less than about 290. The preferred fluorescent range is from about 5 to about 90 for 0.125 percent polyamide and from about 5 to about 240 for 0.25 percent polyamide.

The b* difference (UV off-UV on) ranges from about 0.2 to less than about 1.4. Preferably, the b* difference ranges from about 0.75 at 0.125 percent polyamide to about 1.35 at 0.25 percent polyamide.

One skilled in the art will understand that various modifications can be made to the present invention without departing from the teachings hereof. It is to be further understood that the details, materials and arrangement of the parts of the specific embodiments have been described and illustrated to explain the nature of the invention herein is not intended to limit the claims which define the scope of the invention. Changes may be made by those skilled in the art without departing from spirt and scope of the invention as expressed in the appended claims.

We claim:

1. A blend composition comprising a polyester from about 0.01 weight percent to about 5 weight percent of an acetaldehyde reducing compound, based on the weight of the blend composition, and an optical brightener, wherein an article made from said blend has a reduced b* value and a fluorescent intensity of less than about 280.

2. The composition of claim 1 wherein said blend comprises from about 95 weight percent to about 99.99 weight percent of a polyester comprising:
   (a) at least 85 mole percent, based on 100 mole percent, of a dicarboxylic acid having repeating units selected from the group consisting of terephthalic acid, dimethyl terephthalate, isophthalic acid, dimethyl isophthalate, dimethyl-2,6-naphthalenedicarboxlyate, and 2,6-naphthalenedicarboxylate; and
   (b) at least 85 mole percent, based on 100 mole percent, of a diol component having repeating units from selected the group consisting of ethylene glycol, diethylene glycol, 1,4-cyclohexanedimethanol, and 1,4-butanediol.

3. The composition of claim 2 wherein said acetaldehyde reducing compound is selected from the group consisting of polyamide and polyesteramide.

4. The composition of claim 2 wherein said blend has from about 0.01 weight percent to about 2 weight percent of said acetaldehyde reducing compound and said acetaldehyde reducing compound is selected from the group consisting of polyamide and polyesteramide.

5. The composition of claim 3 wherein said polyamide is selected from the group consisting of low molecular weight partially aromatic polyamides having a number average molecular weight of less than 15,000, low molecular weight aliphatic polyamides having a number average molecular weight of less than 7,000, wholly aromatic polyamides and combinations thereof.

6. The composition of claim 5 wherein said polyamide contains a residue from the group selected from isophthalic acid, terephthalic acid, cyclohexanedicarboxylic acid, meta- or para-xylylene diamine, 1,3- or 1,4-cyclohexane(bis) methylamine, aliphatic diacids with 6 to 12 carbon atoms, aliphatic amino acids or lactams with 6 to 12 carbon atoms, and aliphatic diamines with 4 to 12 carbon atoms.

7. The composition of claim 5 wherein said partially aromatic polyamide is selected from the group consisting of poly(m-xylylene adipamide), poly(hexamethylene isophthalamide), poly(hexamethylene adipamide-co-isophthalamide), poly(hexamethylene adipamide-co-terephthalamide), poly(hexamethylene isophthalamide-co-terephthalamide) and mixtures thereof.

8. The composition of claim 5 wherein said partially aromatic polyamide is poly(m-xylylene adipamide) having a number average molecular weight of about 4,000 to about 7,000.

9. The composition of claim 3 wherein said polyesteramide has the formula:

$$A(N)_x(D)_y$$

where A is at least one dicarboxylic acid selected from the group consisting of aromatic and cycloaliphatic dicarboxylic acids having 8 to 14 carbon atoms, and aliphatic dicarboxylic acids having 3 to 24 carbon atoms selected from the group consisting of terephthalic acid, isophthalic acid, 1,4-cyclohexanedicarboxylic acid, 1,3-cyclohexanedicarboxylic acid, 2,6-naphthalene dicarboxylic acid, succinic acid, adipic acid, azelaic acid, sebacic acid, and mixtures thereof; N is a diamine having 2 to 24 carbon atoms selected from the group consisting of ethylene diamine, propane diamine, butane diamine, hexane diamine, 1,4cyclohexanediamine, 1,3-cyclohexane diamine, 1,4-phenylene diamine, methylene dianiline, 1,3-xylylene diamine, 1,3-(2,2-dimethyl) propane diamine, 1,4 and 1,3-cyclohexanebismethylamine, 1,4-xylylene diamine, bis (p-aminocyclohexyl)methane and combination thereof; D is a diol having 2 to 14 carbon atoms selected from the group consisting of ethylene glycol, diethylene glycol, triethylene glycol, propane diol, 1,4-cyclohexanediol, 1,4-butanediol, 2,2-bis-(4-hydroxy-cyclohexane)-propane, 1,3-(2,2-dimethyl)propane diol, 1,4-cyclohexanedimethanol, 1,4-di-(hydroxyethoxy) benzene, hydroquinone, bisphenol a and combinations thereof; X is an integer from 0.01 to 0.99; and Y is an integer from 0.99 to 0.01, wherein the sum of X and Y is equal to 1.0.

10. The composition of claim 1 wherein said fluorescent intensity is from about 3 to about 240.

11. The composition of claim 1 wherein said b* value has a difference of from about 0.2 to less than about 1.4.

12. The composition of claim 1 wherein said b* value has a difference of from about 0.75 to less than about 1.35.

13. The composition of claim 1 wherein said blend has less than 50 ppm of said optical brightener.

14. The composition of claim 1 wherein said blend has from about 1 ppm to less than about 50 ppm of said optical brightener.

15. The composition of claim 13 wherein said optical brightener is selected from the group consisting of bis (benzoxazolyl) stilbenes; symmetrical and asymmetrical bistriazinyl derivatives of 4,4'-diaminostilbene-2,2'-disulfonic acid; mono(azol-2-yl)stilbenes selected from the group consisting of 2-(stilben-4-yl) naphthotriazoles and 2-(4-phenylstilben-4-yl)benzoxazoles; bis(azol-2-yl) stilbenes; styryl derivatives of benzene and biphenyl selected from the group consisting of 1,4-bis(styryl) benzenes and 4,4'-bis(styryl)biphenyls; 1,3-diphenyl-2-pyrazolines; bis(benzoxazol-2-yl) derivatives; derivatives of bis(benzimidazol-2-yl); and 2-(benzofuran-2-yl) benzimidazoles.

16. The composition of claim 1 wherein a molded article from said blend has a b* value of less than about 2.5.

17. The composition of claim 1 wherein a molded article from said blend has a b* value of less than about 2.

18. The composition of claim 1 wherein a molded article from said blend has a b* value of less than about 1.5.

19. A compositional blend comprising:
(a) from about 95 weight percent to about 99.99 weight percent of a polyester comprising:
(i) at least 85 mole percent, based on 100 mole percent, of a dicarboxylic acid having repeating units selected from the group consisting of terephthalic acid, dimethyl terephthalate, isophthalic acid, dimethyl isophthalate, dimethyl-2,6-naphthalenedicarboxlyate, and 2,6-naphthalenedicarboxylate; and
(ii) at least 85 mole percent, based on 100 mole percent, of a diol component having repeating units from selected the group consisting of ethylene glycol, diethylene glycol, 1,4-cyclohexanedimethanol, and 1,4-butanediol;
(b) from about 0.1 to about 5 weight percent of a acetaldehyde reducing agent selected from the group consisting of polyamide and polyesteramide, wherein said polyamide is selected from the group consisting of low molecular weight partially aromatic polyamides having a number average molecular weight of less than 15,000, low molecular weight aliphatic polyamides having a number average molecular weight of less than 7,000, wholly aromatic polyamides and combinations thereof and said polyesteramide has the formula:

where A is at least one dicarboxylic acid selected from the group consisting of aromatic and cycloaliphatic dicarboxylic acids having 8 to 14 carbon atoms, and aliphatic dicarboxylic acids having 3 to 24 carbon atoms; N is a diamine having 2 to 24 carbon atoms; D is a diol having 2 to 14 carbon atoms; X is an integer from 0.01 to 0.99; and Y is an integer from 0.99 to 0.01, wherein the sum of X and Y is equal to 1.0; and
(c) less than 50 ppm of an optical brightener, wherein an article made from said blend has a reduced b* value and a fluorescent intensity of from about 5 to less than about 290.

20. The blend of claim 19 wherein said optical brightener is selected from the group consisting of bis(benzoxazolyl) stilbenes; symmetrical and asymmetrical bistriazinyl derivatives of 4,4'-diaminostilbene-2,2'-disulfonic acid; mono (azol-2-yl)stilbenes selected from the group consisting of 2-(stilben-4-yl) naphthotriazoles and 2-(4-phenylstilben-4-yl)benzoxazoles; bis(azol-2-yl)stilbenes; styryl derivatives of benzene and biphenyl selected from the group consisting of 1,4-bis(styryl)benzenes and 4,4'-bis(stylyl)biphenyls; 1,3-diphenyl-2-pyrazolines; bis(benzoxazol-2-yl) derivatives; derivatives of bis(benzimidazol-2-yl); and 2-(benzofuran-2-yl)benzimidazoles.

21. The blend of claim 20 wherein said optical brightener is selected from the group consisting of bis(benzoxazolyl) stilbenes.

22. The composition of claim 21 wherein said blend has from about 1 ppm to less than about 50 ppm of said optical brightener.

23. A compositional blend comprising:
(a) from about 95 weight percent to about 99.99 weight percent of a polyester comprising:
(i) at least 85 mole percent, based on 100 mole percent, of a dicarboxylic acid having repeating units selected from the group consisting of terephthalic acid, dimethyl terephthalate, isophthalic acid, dimethyl isophthalate, dimethyl-2,6-naphthalenedicarboxlyate, and 2,6-naphthalenedicarboxylate; and
(ii) at least 85 mole percent, based on 100 mole percent, of a diol component having repeating units from selected the group consisting of ethylene glycol, diethylene glycol, 1,4-cyclohexanedimethanol, and 1,4-butanediol;
(b) from about 0.1 to about 5 weight percent of a acetaldehyde reducing agent selected from the group consisting of polyamide and polyesteramide, wherein said polyamide is selected from the group consisting of low molecular weight partially aromatic polyamides having a number average molecular weight of less than 15,000, low molecular weight aliphatic polyamides having a number average molecular weight of less than 7,000, wholly aromatic polyamides and combinations thereof and said polyesteramide has the formula:

where A is at least one dicarboxylic acid selected from the group consisting of aromatic and cycloaliphatic dicarboxylic acids having 8 to 14 carbon atoms, and aliphatic dicarboxylic acids having 3 to 24 carbon atoms selected from the group consisting of terephthalic acid, isophthalic acid, 1,4-cyclohexanedicarboxylic acid, 1,3-cyclohexanedicarboxylic acid, 2,6-naphthalene dicarboxylic acid, succinic acid, adipic acid, azelaic acid, sebacic acid, and mixtures thereof; N is a diamine having 2 to 24 carbon atoms selected from the group consisting of ethylene diamine, propane diamine, butane diamine, hexane diamine, 1,4-cyclohexanediamine, 1,3-cyclohexane diamine, 1,4-phenylene diamine, methylene dianiline, 1,3-xylylene diamine, 1,3-(2,2-dimethyl)propane diamine, 1,4 and 1,3-cyclohexanebismethylamine, 1,4-xylylene diamine, bis (p-aminocyclohexyl)methane and combination thereof; D is a diol having 2 to 14 carbon atoms selected from the group consisting of ethylene glycol, diethylene glycol, triethylene glycol, propane diol, 1,4-cyclohexanediol, 1,4-butanediol, 2,2-bis-(4-hydroxycyclohexane)-propane, 1,3-(2,2-dimethyl)propane diol, 1,4-cyclohexanedimethanol, 1,4-di-(hydroxyethoxy) benzene, hydroquinone, bisphenol a and combinations thereof; X is an integer from 0.01 to 0.99; and Y is an integer from 0.99 to 0.01, wherein the sum of X and Y is equal to 1.0; and (c) less than 50 ppm of an optical brightener, wherein a molded article from said blend has a b* value of less than about 2.5 and a fluorescent intensity of from about 5 to about 240.

24. The blend of claim 23 wherein said acetaldehyde reducing compound is selected from the group consisting of polyamides containing a residue from poly(m-xylylene adipamide), poly(hexamethylene isophthalamide), poly (hexamethylene adipamide-co-isophthalamide), poly (hexamethylene adipamide-co-terephthalamide), poly (hexamethylene isophthalamide-co-terephthalamide), polycapramide (nylon 6), poly(imino(1-oxo-1,7-heptanediyl)) (nylon 7), poly(imino(1-oxo-1,9-nonanediyl)) (nylon-9), polyundecane-amide (nylon- 11), polyaurylactam (nylon 12), poly(ethylene-adipamide) (nylon 2,6), poly (tetramethylene-adipamide) (nylon 4,6), poly (hexamethylene-adipamide) (nylon 6,6), poly (hexamethylene-sebacamide) (nylon 6,10), poly (hexamethylene-dodecamide) (nylon 6,12), poly (octamethylene-adipamide) (nylon 8,6), poly (decamethylene-adipamide) (nylon 10,6), poly (dodecamethylene-adipamide) (nylon 12,6) and poly (dodecamethylene-sebacamide) (nylon 12,8).

25. The blend of claim 23 wherein said optical brightener is selected from the group consisting of bis(benzoxazolyl) stilbenes.

26. The blend of claim 23 wherein said molded article is a food or beverage container.

27. The blend of claim 26 wherein said container has a b* value of less than about 2.

28. The blend of claim 26 wherein said container has a b* value of less than about 1.5.

29. The blend of claim 23 wherein said blend has a fluorescent intensity of from about 5 to about 90.

* * * * *